Patented May 17, 1932

1,858,640

UNITED STATES PATENT OFFICE

MARK E. PUTNAM, OF MIDLAND, MICHIGAN, ASSIGNOR TO THE DOW CHEMICAL COMPANY, OF MIDLAND, MICHIGAN, A CORPORATION OF MICHIGAN

MANUFACTURE OF AMINE HYDROHALIDES

No Drawing.   Application filed September 14, 1929.   Serial No. 392,725.

The present invention relates to the manufacture of amine hydrohalides, specifically aromatic amine hydrohalides, and more specifically to new methods for the manufacture of aniline hydrochloride.

Hitherto, the usual industrial method for the preparation of aniline hydrochloride has involved reacting between aniline and aqueous hydrochloric acid. For instance, a concentrated solution of aniline hydrochloride may be formed by adding aniline to said concentrated aqueous acid, the solution being hot due to heat of reaction, (with or without added heat), and which on cooling deposits crystalline aniline hydrochloride, the latter then being separated from the mother liquor and dried. Said mother liquor may be worked to recover product dissolved therein by repeated concentrations, crystallizations, separations, and dryings. The product so obtained from said aqueous method is usually discolored or becomes so after standing a short time, and the yield is appreciably lowered by losses due to hydrolysis of aniline hydrochloride in aqueous solution, to oxidation and/or decomposition of material, and in the several necessary operative steps such as concentrations, crystallizations, separations, and dryings. Moreover, oftentimes a material such as stannous chloride is utilized to decolorize the colored aqueous aniline hydrochloride solutions, such procedure involving addition of a metal salt impurity to the solution.

Methods for the laboratory preparation of amine hydrohalides are well known in which nonaqueous solvents are employed. For instance, Hoffman (Lassar Cohn; Arbeits Methoden, 4th Ed., 1907, Spl. part, p. 127: Leopold Voss Pub.) obtained crystals of ethyl aniline hydrochloride by passing gaseous hydrochloric acid into an ether solution of the free amine. Ullman (Ber. 31—1699; 1898) prepared the hydrochlorides of aniline, the toluidines, and xylidines, by conducting the said gaseous acid into carbon tetrachloride solutions of the respective amines. Lassar Cohn (loc. cit.) has stated in all such cases, ether can be replaced by benzene, etc.

The aforementioned aqueous method possesses the disadvantages of having numerous operative steps, yielding an impure and discolored product, and incurring the industrial hazard of aniline poisoning, particularly when aqueous solutions are to be handled. The non-aqueous method has disadvantages such as solvent loss, danger of poisoning by either solvent or amine or both, fire hazard, the use of apparatus necessary for control of solvent vapors and solvent recovery and/or purification.

I have now found that amine hydrohalides, e. g. amine hydrobromides and hydrochlorides, may be prepared by reacting in the vapor phase between an amine and a hydrogen halide, in the absence of a solvent or solvent vapors, whereby a pure and white product is obtained directly without necessity for further operative steps such as repeated concentrations, crystallizations, solvent evaporations, etc.

To the accomplishment of the foregoing and related ends, my invention, then, consists of the method hereinafter fully described and particularly pointed out in the claims, the following description setting forth in detail several modes of carrying out the invention, such disclosed modes illustrating, however, but several of various ways in which the principle of my invention may be used.

For the purpose of illustration, I shall describe my new and improved method as applied to the preparation of aniline hydrochloride. In accordance with my improved procedure, aniline is vaporized and then admixed with gaseous hydrogen chloride in any preferred manner, the temperature of the reaction zone being controlled within a range of approximately 184°–250° C., that is, between the boiling point of aniline and the temperature at which substantial decomposition of aniline hydrochloride occurs. Enough gaseous hydrogen chloride is admitted to combine with all the aniline, or to be in slight excess, as preferred. Inasmuch as the boiling point of aniline is 184° C., and the melting point of aniline hydrochloride is 198° C., it is obvious that the form of the reaction product is dependent upon the temperature conditions and the rate and nature of heat loss from the reaction mixture. I have found that the rate of reaction may be restricted by controlling the rate of introduction of the reactants, the temperature being maintained at a point such that a solid form of product is obtained as a fine powder which may be settled out and removed in any suitable manner from the reaction zone, or which may be conveyed into a separate collecting chamber. If, however, the rate of reaction be increased, as by introducing the reactants at a more rapid rate, the temperature of the reaction mixture may be increased due to the heat of reaction evolved, so that a liquid product may be formed. The latter may be withdrawn as such, or may be chilled in situ or in a connected cooling zone to form a solidified product which may be removed in any convenient manner. Accordingly, my process may be conducted, having due regard to temperature control and rate of heat abstraction, to form immediately either a powdered, liquid, or vaporized product, which may then be withdrawn and, if liquid or vaporized, solidified in any desired manner, and such solidified product may be further treated by mechanical means or otherwise so as to prepare the same in any desired physical form.

The following detailed examples are given by way of illustration of my improved method, but it is to be understood that such examples are not to be interpreted as a limitation upon the invention.

Example 1

93 grams of aniline was distilled, the vapors passing into a vessel containing an atmosphere of dry hydrogen chloride gas, the latter being maintained at approximately one atmosphere pressure during the course of the experiment. Aniline hydrochloride collected on the walls of said vessel as a fine white powder, (M.p. 198° C.) and amounted to a substantially theoretical yield.

Example 2

Ortho-toluidine hydrochloride was prepared in a manner as described in the above example, the product being obtained as a white powder (M.p. 214° C.) and in a substantially theoretical yield.

Variously modified forms of procedure for carrying out the invention will be obvious to one skilled in the art. For example, by employing an excess of hydrochloric acid gas, the product which is precipitated as a fine powder, in suspension, may be swept out of the reaction zone into a collecting chamber by means of the current of excess gas, from which in turn it may be settled by gravity or by centrifugal or other suitable means. The gaseous current may then be recirculated and combined with fresh make-up gas for introduction into the reaction zone. Cooling may be applied to the recirculated gas current, if necessary, to abstract heat therefrom, and a portion thereof may be vented intermittently or continuously to eliminate from the system gradually increasing inert diluents which may enter the system with the gas or otherwise.

The herein described process may be adapted to continuous operation. For instance, the reaction components may be continuously admitted to the reaction zone, and the product withdrawn therefrom continuously or intermittently. If the gaseous hydrogen halide is in an appreciable excess of the amine, such excess of the former may be recycled by mixing with the hydrogen halide gas initially entering the reaction zone. In other words, excess acid gas may be recycled in a closed system, and the process made continuous by suitable introduction of added amounts of acid gas and amine to replace the quantities thereof reacted and removed from the process in the final product. Such modes of operation involve introduction of a controlled stream of aniline vapor into the reaction zone, the maintenance of a constant pressure of hydrochloric acid gas and the control of temperature within the prescribed limits. Under proper control, the handling of material is limited essentially to the charging of the materials and the removal of the dry crystalline salt or a liquid product from the reactor and/or the condensing chamber. By operating in the vapor state in a closed system as herein described, in the substantial absence of air and moisture, the product obtained is pure and white, requiring no further purification, and the yield is substantially quantitative.

I do not limit my invention to the materials specifically mentioned in the examples. Other equivalent amines, e. g. primary, secondary, or tertiary aliphatic amines, such as the alkyl amines, or aromatic amines such as aniline derivatives in which one or more alkyl groups are attached to the ring and/or the nitrogen, may be used. The temperature of the reaction zone will depend on the particular amine employed. Such material, i. e. amine and hydrogen halide gas, should be substantially anhydrous.

The hydrogen halide gas i. e. hydrogen bromide or hydrogen chloride, utilized in the present procedure may be diluted with a gas unreactive with the reaction components, e. g. nitrogen, and the vaporized salt may be carried to the cooler by a current of such diluted gas. Furthermore, the process may be operated under either reduced or increased pressure, if desired.

Among the advantages of my new and improved method for the manufacture of amine hydrohalides are: (1) A dry solid or liquid product is directly produced, (2) said product is of the highest purity and does not require further purification, (3) practically quantitative yields are obtained, (4) removal or recovery of amine or amine hydrohalide solvents or diluents is eliminated, (5) the method is simplified and frequent rehandling of materials is avoided, with consequent (6) lower cost of product.

In its general aspects, my invention involves reacting in the vapor phase between an amine and a hydrogen halide, under substantially anhydrous conditions, and in the absence of a solvent or solvent vapors.

The term "hydrohalide" mentioned in the claims, is understood to refer to a hydrobromide or hydrochloride, whereas the expression "hydrogen halide" represents either hydrogen bromide or hydrogen chloride.

Other modes of applying the principle of my invention may be employed instead of the ones explained, change being made as regards the process herein disclosed, provided the step or steps stated by any of the following claims or the equivalent of such stated step or steps be employed.

I therefore particularly point out and distinctly claim as my invention:—

1. The method of making an aromatic amine hydrohalide, which comprises reacting in the vapor phase and at a temperature below 250° C., between an aromatic amine and a hydrogen halide.

2. The method of making aniline hydrochloride, which comprises reacting in the vapor phase and at a temperature below 250° C. between aniline and hydrogen chloride.

3. The method of making aniline hydrochloride, which comprises reacting in the vapor phase between aniline and hydrogen chloride, and maintaining the reaction zone at a temperature between 184° and 250° C.

4. The method of making an aniline hydrohalide, which comprises reacting in the vapor phase and at a temperature below 250° C. between aniline and a hydrogen halide in the absence of a solvent or solvent vapors.

5. The method of making aniline hydrochloride, which comprises reacting in the vapor phase and at a temperature below 250° C. between aniline and hydrogen chloride in the absence of a solvent or solvent vapors.

6. The method of making aniline hydrochloride, which comprises reacting in the vapor phase between aniline and hydrogen chloride in the absence of a solvent or solvent vapors at a temperature between 184° and 250° C.

7. The method of making aniline hydrochloride, which comprises reacting in the vapor phase between aniline and hydrogen chloride, the latter being in excess of the combining proportion, and maintaining the reaction zone at a temperature between 184° and 250° C.

8. The method of making aniline hydrochloride, which comprises reacting in the vapor phase and at a temperature below 250° C. between aniline and hydrogen chloride, and condensing the product in presence of the latter, the temperature being maintained within the above stated temperature range during such condensation.

Signed by me this 11th day of September, 1929.

MARK E. PUTNAM.

DISCLAIMER 1,858,640.—*Mark E. Putnam*, Midland, Mich. MANUFACTURE OF AMINE HYDROHALIDES. Patent dated May 17, 1932. Disclaimer filed May 3, 1934, by the assignee, *The Dow Chemical Company.*

Enters this disclaimer to a certain claim of the above-identified patent, namely, claim 1.

[*Official Gazette May 29, 1934.*]